United States Patent [19]

McIntire

[11] 4,419,984
[45] Dec. 13, 1983

[54] RADIANT ENERGY COLLECTOR

[75] Inventor: William R. McIntire, Downers Grove, Ill.

[73] Assignee: University Patents, Inc., Norwalk, Conn.

[21] Appl. No.: 121,541

[22] Filed: Feb. 14, 1980

[51] Int. Cl.³ .............................................. F24J 3/02
[52] U.S. Cl. .................................. 126/439; 126/443
[58] Field of Search .............. 126/438, 439, 451, 443; 350/293, 296

[56] References Cited

U.S. PATENT DOCUMENTS

| | | | |
|---|---|---|---|
| 3,964,464 | 6/1976 | Hockman | 350/293 |
| 4,050,444 | 9/1977 | Dolamore | 350/293 |
| 4,230,095 | 10/1980 | Winston | 126/438 |

OTHER PUBLICATIONS

Applied Optics, Feb. 1976/vol. 15, No. 2, pp. 291 and 292.

*Primary Examiner*—Carroll B. Dority, Jr.
*Attorney, Agent, or Firm*—David N. Koffsky

[57] ABSTRACT

A cylindrical radiant energy collector is provided which includes a reflector spaced apart from an energy absorber. The reflector is of a particular shape which ideally eliminates gap losses. The reflector includes a plurality of adjacent facets of V shaped segments sloped so as to reflect all energy entering between said absorber and said reflector onto said absorber. The outer arms of each facet are sloped to reflect one type of extremal ray in a line substantially tangent to the lowermost extremity of the energy absorber. The inner arms of the facets are sloped to reflect onto the absorber all rays either falling directly thereon or as a result of reflection from an outer arm.

5 Claims, 8 Drawing Figures

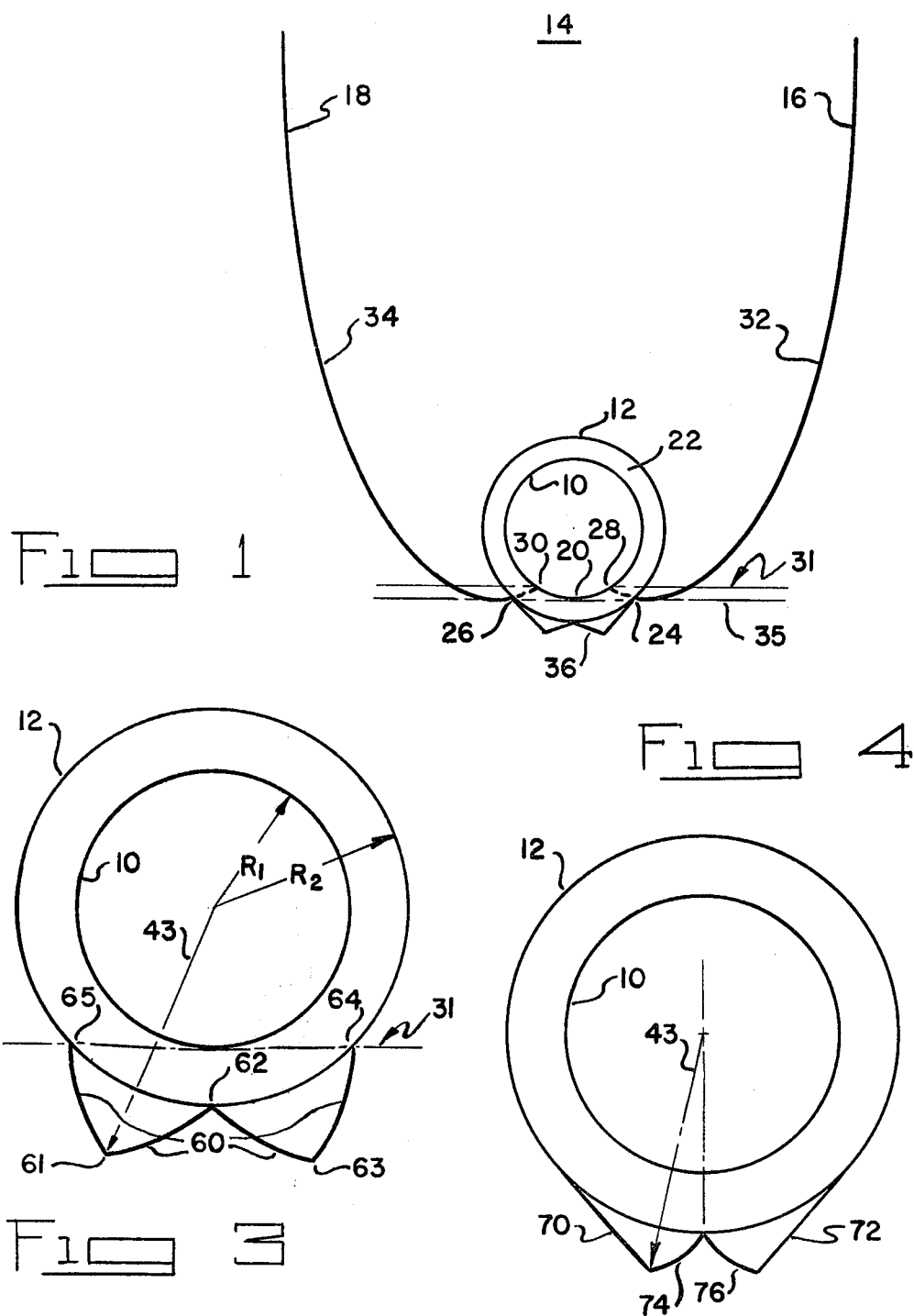

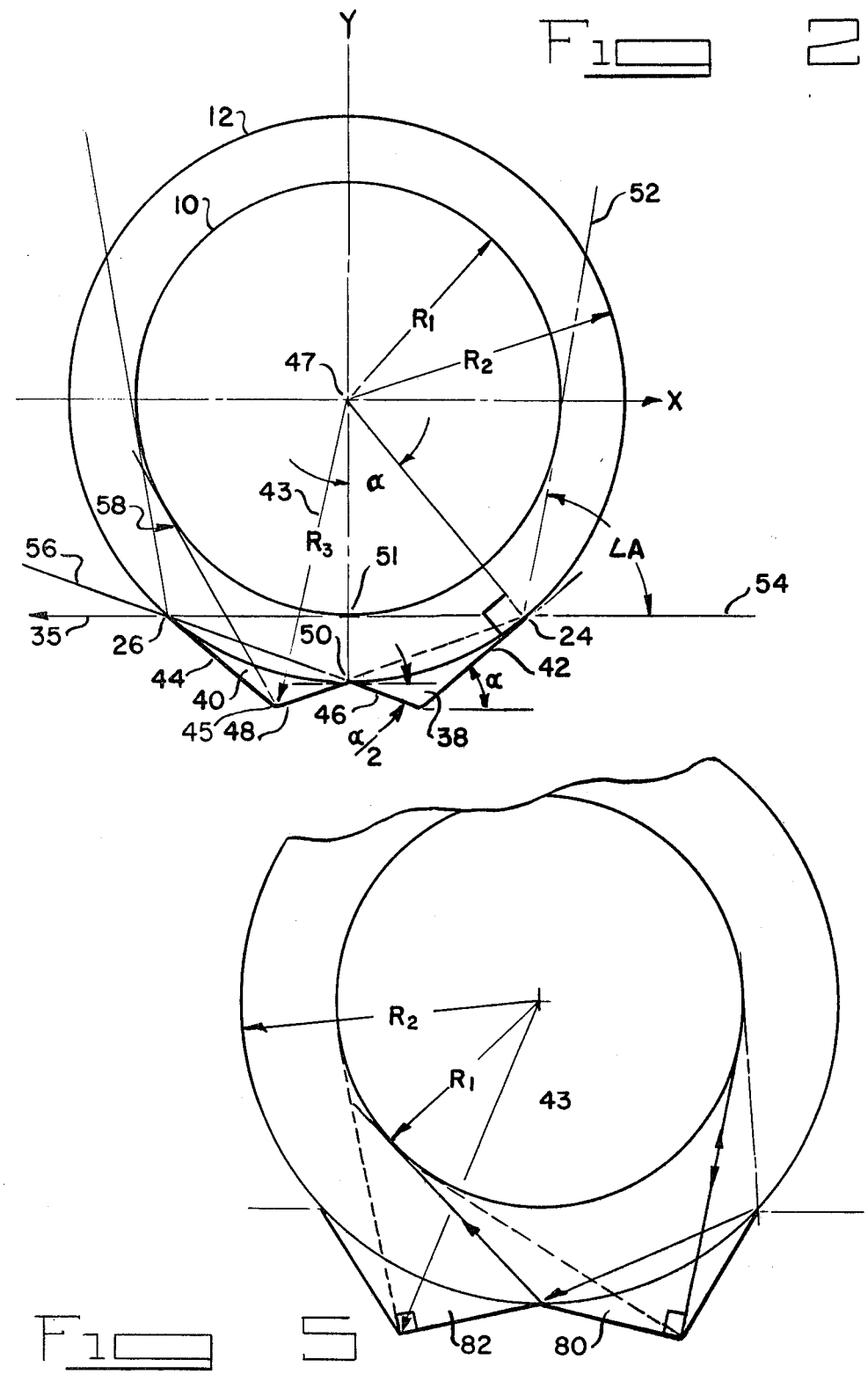

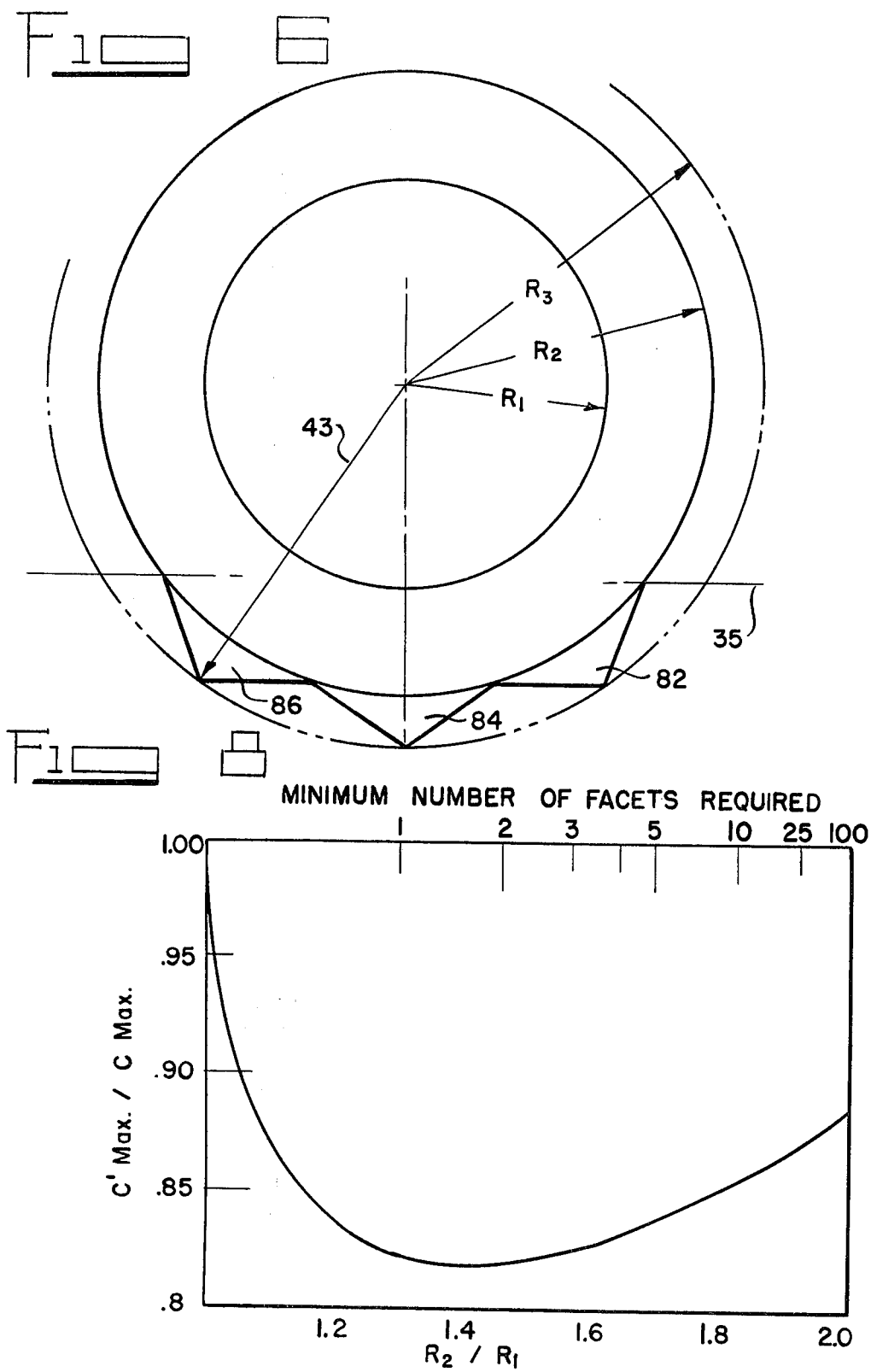

4,419,984

RADIANT ENERGY COLLECTOR

CONTRACTUAL ORIGIN OF THE INVENTION

The invention described herein was made in the course, of, or under, a contract with the UNITED STATES DEPARTMENT OF ENERGY.

BACKGROUND OF THE INVENTION

The present invention relates generally to a collector of radiant energy of solar origin. A particular type of solar energy concentration and collection device is a cylindrical or trough shape collector comprised of an energy absorber and one or two opposing reflective side walls. The collector is formed by extending the transverse cross sections of the absorber and the reflector wall or walls longitudinally, parallel to an axis, to form the trough like structure. This is a non-imaging device and it has been determined that the optimal "ideal side wall countour" to achieve maximum concentration of energy incident on the entrance aperture onto the surface of the absorber is determined by the angle of extreme rays from the radiant energy source, the cross section of the absorber, and the desired maximum angle of incidence less than or equal to 90° of concentrated energy on the surface of the absorber.

U.S. Pat. No. 3,923,381 describes the ideal side wall contour for concentrating energy from an infinite source onto the top surface of a flat energy absorber. U.S. Pat. No. 4,002,499 describeds the ideal side wall contour for concentrating energy from an infinite source onto non-flat energy absorbers and onto both sides of flat energy absorbers. U.S. Pat. No. 3,957,031 describes the ideal side wall contour for concentrating energy from a finite source onto an energy absorber of arbitrary shape. U.S. Patent Application Ser. No. 850,340, now U.S. Pat. No. 4,130,107, gives the ideal side wall contour for concentrating the energy from an infinite or finite source onto an energy absorber of arbitrary shape wherein the maximum angle of incidence of energy concentrated onto the surface of the energy absorber is restricted to a particular value less than 90°. U.S. Patent Application Ser. No. 714,863, now U.S. Pat. No. 4,114,592, describes the ideal side wall contour for concentrating energy from an infinite or finite source onto an energy absorber of arbitrary shape wherein a refractive medium acts on the rays of incident energy prior to their being concentrated onto the energy absorber. A publication, Applied Optics, Vol. 15 No. 2, pages 291–292, February 1976 describes concentration of radiant energy from an infinite or finite source onto the surface of an arbitrary energy absorber wherein the reflective wall is obtained by total internal reflection within the interface between a dielectric medium and the exterior environment. To the extent, the above cited patents contain "essential" material necessary to support the claims hereof or indicate background they are expressly incorporated by references herein.

The characteristic of all these idealized non-imaging concentrators is the fact that the theoretical reflector side wall must touch the absorber surface. This is a theoretical requirement which is not met by reflectors actually used for solar concentration. In practice, the reflectors are isolated from the absorber by a gap which as a minimum provides an air gap to thermally isolate the absorber from the reflector. In many cases the gap must be large enough to accommodate a cover tube for a vacuum or a convection suppressing air gap, plus tolerances for tube essentricity, dimensional variation and bow and assembly tolerances. These gaps introduce losses of 10% or more in the efficiency of collectors. One solution or attempt to deal with the gap loss problem is described in U.S. Pat. No. 4,230,095 of Winston. Winston, in that patent, utilizes the concept of the virtual absorber. In actual practice, this design requires a space between the absorber tube and the reflector which can lead to gap losses of 10%. These losses arise even if the concentrator design is used not as a primary solar concentrator but as a secondary concentrator.

It is therefore an object of this invention to ideally eliminate gap losses associated with non-imaging trough shape solar collectors.

Another object of this invention is to provide a trough-shape, non-imaging solar collector having a portion of its side wall in the form of an ideal shape combined with a gap lossless reflector portion below the absorber.

Another object of the invention is to provide a solar collector having a gap lossless reflective wall positioned separated from an energy absorber for distributing incident energy onto the surface of the absorber.

SUMMARY OF THE INVENTION

A device is provided for reflecting radiant energy incident thereon onto the surface of an energy absorber. The device is positioned spaced apart from the absorber and includes a plurality of adjacent facets or V-shaped segments which insure that the incident energy within a given range is not reflected out through the gap formed between the device and the absorber. The form and angle of the V-shaped segments is particularly defined.

BRIEF DESCRIPTION OF THE DRAWINGS

FIG. 1 is a cross section of a trough shaped radiant energy collection and concentration device;

FIG. 2 is a cross section of the bottom portion reflector of the collector of FIG. 1;

FIGS. 3, 4, 5 and 6 are alternate embodiments of FIG. 2;

FIG. 8 is a curve relating gap width to concentration ratio.

DETAILED DESCRIPTION OF THE DRAWINGS

Figure 7:
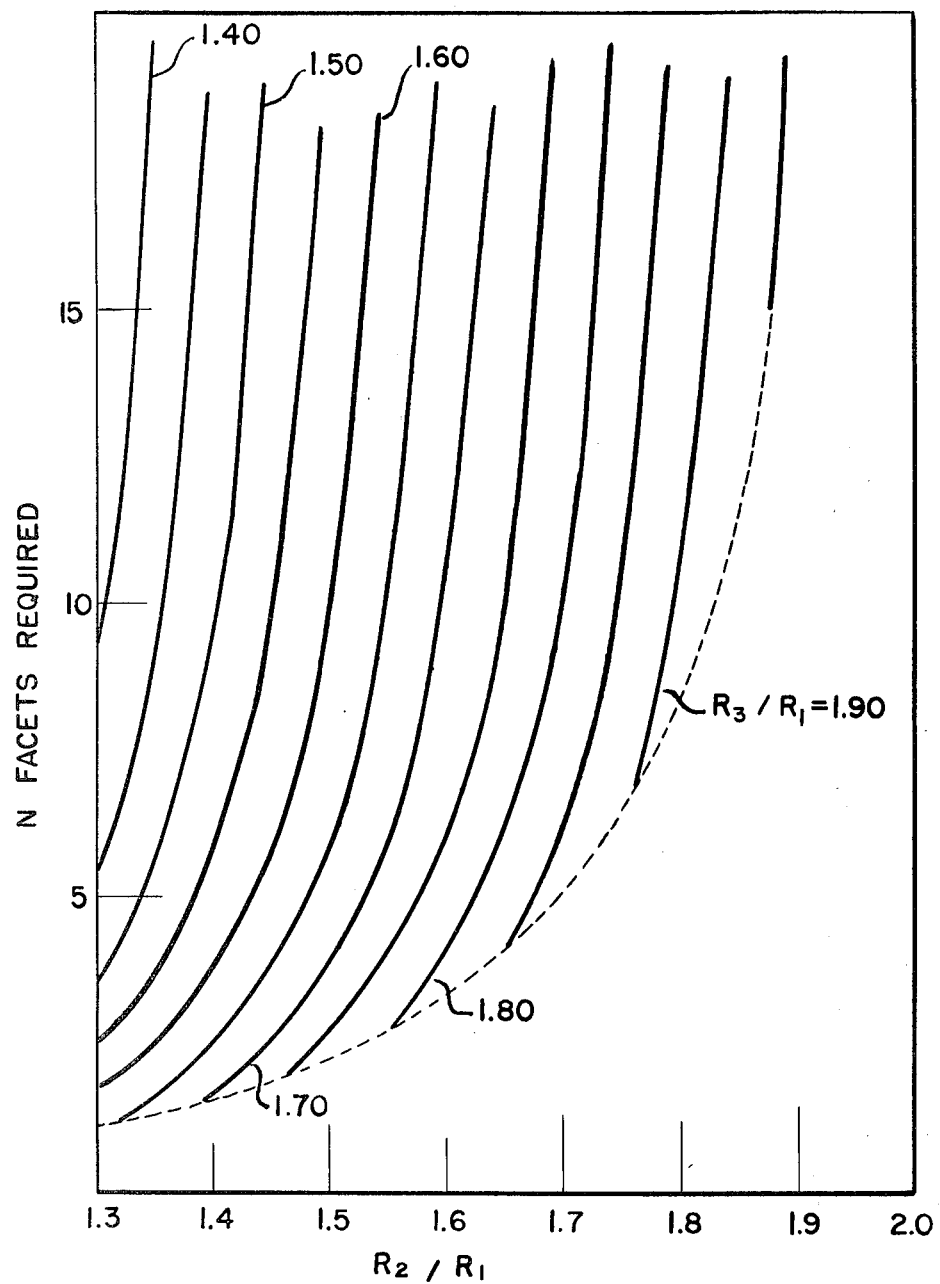
FIG. 7 is a set of curves relating the number of facets of a collector bottom portion reflector to the gap between the absorber and the bottom reflector portion.

Referring to FIG. 1 there is shown the transverse cross section of a cylindrical radiant energy collection and concentration device. The device includes an energy absorber 10 contained within a glazing 12, i.e. an envelope transparent to radiant energy to be collected. The energy absorber may be any device for utilizing incident radiant energy such as a coolant tube, photovoltaic device, heat pipe, etc. The glazing which may be of glass or some other transparent material, may be evacuated or contain some gas such as air. The glazing is intended to reduce conductive and convective losses from the surface of the energy absorber 10. Of course, there may even be nothing between the absorber and a reflector, i.e. just a gap to keep the absorber away from the reflectors. Circle 12 then just represents the gap. Energy incident on the entrance aperture 14 is directed through glazing 12 onto the surface of absorber 10 by reflecting opposing walls 16 and 18. According to the references previously referred to, the ideal contour for walls 16 and 18 would begin on the surface of absorber 10, say at point 20. To provide the ideal contour, according to the references, wherein the absorber is enveloped by a glazing 12, it would therefore be necessary to include a portion of the reflective side walls within the annular space 22 between glazing 12 and absorber 10. This is not very practical, increasing fabrication costs and assembly complexity. Prior Art practice has modified the ideal contour by eliminating the portion of the ideal contour within the glazing 12 or by determining the ideal contour with reference to the cross section of glazing 12 rather than absorber 10. In both cases, the reflectors 16 and 18 start along side the surface of glazing 12. There is herein provided a reflector design which ideally eliminates the gap loss associated with prior art designs.

The ideal contour herein disclosed, which ideally elminates reflector gap losses, utilizes the rules for determining ideal contour disclosed in the previously mentioned references extending from points 24 and 26 along glazing 12 and assuming an absorber surface which extends between points 28 and 30 above axis 31 thereby forming wall portions 32 and 34. Points 24 and 26 are chosen along surface 12. If the collector device is utilized as a primary solar collector wherein energy is incident at the gap between points 24 and 26, then the points 24 and 26 are no lower than line 35. Line 35 is a line tangent to absorber 10. In certain applications, such as where the bottom portion is utilized as part of a secondary collector, the extreme ray 54 may be restricted to an incident angle less than the 90° shown in FIG. 2. Then the points where the bottom portion begins can be chosen to be below line 35 to conform to the actual incidence of energy to be collected. The extremal rays which are used to determine bottom portion shape, as will be described, are then the extreme rays of this confined energy. The portion of each wall 16 and 18 between points 24 and 28 and 26 and 30, respectivefully, (shown in phantom lines), which would be within glazing 12 is omitted. Connecting portions 32 and 34 of walls 16 and 18 is a reflective bottom portion 36 which in this embodiment is W shaped. Bottom portion reflector 36 will reduce gap losses. There will be described various different embodiments of this bottom portion reflector. It is, of course, readily apparent that the bottom portion reflector can be utilized alone, without any upper portion.

Referring to FIG. 2 there is shown more particularly one embodiment of the bottom reflector. $R_1$ is the radius of absorber 10 which here is shown circular. $R_2$ is the outer radius of the glazing 12. A coordinate system referenced to the X—Y axes is utilized. The W shaped bottom portion begins at the points 26 ($-R_1 \tan \gamma$, $-R_1$) and 24 ($R_1 \tan \gamma$, $-R_1$), where $\gamma = \cos^{-1}(R_1/R_2)$. The W bottom portion includes two facets 38 and 40. A facet is a unit of a bottom portion which has two opposing arms which for convenience we say are either on the left or right side of a facet axis 43 from the nadir 45 through the center 47 of absorber 10. The arms 42 and 44 of the W are tangent to glazing 12 at points 24 and 26, respectively. The points 24 and 26 are in this embodiment chosen to be at the same height $-R_1$ as the bottom of absorber 10 i.e. along axis 35. The other two arms of the W, 46 and 48 are drawn by extending the lines at the angle $\gamma/2$ from point 50 (O,$-R_2$).

Operation of the W can be shown by consideration of extremal ray 52 which is tangent to the absorber 10 and still intersects the W at point 24. This ray will be directed along axis 35 and thereby be tangent to the absorber 10 where axis 35 intersects the absorber 10 at point 51. The other extremal ray 54 is a ray which enters horizontally along the axis 35 and intersects the absorber 10 at point 51. All rays of incidence between these extreme rays, within angle A, will be directed onto the surface of the absorber 10. Therefore, the W provides a gap lossless solution.

The arms 46 and 48 of each facet prevent re-reflection out of the bottom gap area. The shallowest angle for arms 46 and 48 is to make them extensions of the dashed lines from the upper tangent points 24 and 26 through the center point 50 of the W (O,$-R_2$). Extremal rays incident on the arms 46 and 48 are illustrated by rays 56 and 58 which are reflected by the arm 48 onto the surface of the absorber 10. Rays 56 and 58 are always within acceptance angle A. The particular embodiment shown in FIG. 2, has the minimum slopes for the arms 46 and 48 for which the arm 46 cannot see the arm 44. This prevents rays from requiring three reflections in the W before hitting absorber 10. This also provides the shallowest W section which can be gap lossless. Shallowness of the W is in the width $R_3-R_2$ where $R_3$ is the distance along axis 43 between points 45 and 47. Because of the geometry, the W of FIG. 2 has the limit that $R_2 = \sqrt{2} R_1$.

Referring to FIG. 3 there is shown an alternative embodiment of the W. Here the W is formed of sections of involutes 60 of the absorber 10's circular cross section. Each involute 60 begins at a point 62, 64, or 65 along the glazing 12 and continues until the involute intersects another involute at points 61 and 63 thereby forming facets. This embodiment will allow the largest gap $R_2-R_1$, which still is gap lossless using only two facets. Here, because of the geometry the limit is $R_2 \approx 1.4879 R_1$.

FIG. 4 shows a hybrid bottom portion using straight line arms 70 and 72 and involute arms 74 and 76. Both of the embodiments of FIGS. 3 and 4 have more reflections before a ray reaches the absorber than that of FIG. 2 and tend to reflect some rays to hit the absorber at high incidence angles, possibly reducing the effetive absorptivity.

Referring to FIG. 5 there is shown another embodiment made up exclusively of straight line arms wherein the different facets 80 and 82 of the W are symmetrical with respect to each of their facet axes 43. This symmetrical version has the largest $R_2-R_1$ for two facets with all straight line arms. Here $R_2 \approx 1.46 R_1$.

The two facet embodiments shown differ in the ease of fabrication. Each obeys the general rules that rays cannot pass below the absorber without hitting an arm of a facet. For use in a primary collector this means that the bottom portion must start no lower than the bottom of the collector. For the special case where the rays to be collected fall within a particular angular collimation, the bottom portion may begin below the absorber since no rays will pass under the absorber which are desired to be collected. Any ray which can reach an arm of a facet immediately after crossing the facet axis of that facet must be reflected onto the absorber. Any ray which can reach an arm of a facet without crossing the facet axis of that facet must be reflected to some other arm in the faceted section and then directed to the absorber. In the case of symmetric facets, the other arm in question will be the opposite arm of the same facet. These rules do not apply to rays coming from the absorber.

Gap lossless designs can employ more than two facets. FIG. 6 illustrates an embodiment using three facets 82, 84 and 86. Each arm of each facet obeys the rules given above as determined by with respect to facet axis 43 for each facet. For a primary collector, the top points of all designs lie on or above the line of $Y = -R$, i.e. axis 35 so no rays can pass beneath the absorber without hitting the faceted section. Each facet separately obeys the general rules described above, and for the symmetrical facet designs, such as the particular three-facet design shown in FIG. 6. there is no interaction among the facets. Facets only interact by shading neighboring facets from any ray outside the angle of acceptance for that particular facet. Therefore, each facet does not have to be the same as other facets of the bottom portion.

For symmetrical facets as shown in FIG. 5 (all segments of equal length and ending on circles of radius $R_2$ and $R_3$), FIG. 7 shows the relationship of the number of facets required to the two outer radii $R_2$ and $R_3$.

A gap lossless design described above can be connected to some shape above the bottom portion as shown in FIG. 1. The optimum reflector shape to use is a version of the ideal non-imaging cusp, modified to start at the outer points of the W as described above. Since the relationship between acceptance half angle and maximum concentration ratio holds for the smaller virtual absorber, above the points 28 and 30, along axis 31, the maximum concentration ratio possible for a given acceptance angle is reduced from the original ideal cusp design value by the factor of the arc length between points 28 and 30 divided by the circumference of the absorber 10. Referring to FIG. 8 there is shown the relationship between the reduction in concentration compared to the maximum obtainable from ideal circumstances as a function of the ratio of the radii $R_2/R_1$. With four straight arms, the gap size limit is $R_2 \approx 1.46 R_1$, with involute segments (FIG. 3), the limit is $R_2 \approx 1.49 R_1$. The limit for an infinite number of segments is $R_2 = 2R_1$.

The gap lossless design herein disclosed significantly increases the optical efficiency of the solar collector by elmination of the gap losses. In addition, as the currently available evacuated tubular receivers have absorbances typically less than 80%, at normal incidence, and lower at glancing incidence, the straight arm embodiments of the bottom portion, tend to have angle of incidence at a greater value on the absorber. The gap lossless system provides for better angles of incidence of rays of energy on the absorber. Gap lossless design allows multiple hits on the absorber and thus provides some enhancement back onto the absorber.

Another benefit derived from the use of this gap lossless design is increased receiver tube-reflector alignment tolerance. The original non-imaging cusp design has been shown to have considerable tolerance to alignment errors. Using the gap lossless design greatly increases that tolerance. Raising the absorber tubes or moving them from side to side will not affect the collection of light as much as for a regular non-imaging cusp collector. For some designs, raising the absorber from its theoretical position actually improves the performance of the concentrators. With a raised absorber tube there will be some gap loss, but there will also be more rays which enter the W region and are subject to the enhancement effects. Similarly, offsetting the tube to one side causes some rays to be rejected but adds enhancement to others. For example, if the receiver tube is offset to either side by one-eighth of $R_1$, the change in optical performance is negligible. The integral of the cosine weighted optical efficiency over the range of incident angles from $-65°$ to $+65°$ is reduced by less than $\frac{1}{2}\%$ compared to the perfect laterial-alignment case.

The optimal design for given acceptance angles and concentration ratio must be determined using a detailed ray trace program since the effects of enhancement, reflection losses, variation of absorbance with angles of incidence angles of interest.

The embodiments shown have utilized circular absorber shapes and an uniform gap. Neither is a prerequisite for practicing the herein disclosed reflector shape. Any shaped absorber can be provided with a bottom reflector which obeys the general rules given. The facet axis used in defining these rules is really no more than an imaginary line dividing each facet.

The embodiments of the invention in which an exclusive property or privilege is claimed are defined as follows:

1. A radiant energy concentration and collection device, comprising:
    an energy absorber having a dimension $R_1$ from the center of said energy absorber to its lowermost extremity and a reflector spaced a distance $R_2$ from the center of said energy absorber,
    said reflector adapted to redirect all radiant energy rays between first and second extremal rays onto said energy absorber, said first extremal ray being tangent to said energy absorber at a lower extremity, said second extremal ray being tangent to said energy absorber but oriented at an angle removed from said first extremal ray,
    said reflector including at least first and second adjacent facets, each facet having opposed inner and outer arms joined at a nadir point and extending to an opening opposite said nadir point, said opening defined by the distance between the ends of said arms, each of said facet openings oriented towards said absorber, the ends of said inner arms of adjacent facets being joined at a distance $R_2$ from the center of said energy absorber, the outer ends of said outer arms of said facet lying on an imaginary circle of said energy absorber,
    said outer arms of each facet sloped to reflect said second extremal rays onto said lower extremity of said energy absorber and any rays falling between said first and second extremal rays onto either the opposing inner arm of one facet or the opposing outer arm of said other facet and thence to the absorber, said inner arms of each facet being sloped to reflect all rays, either falling directly thereon or falling thereon as a result of a reflection from an outer arm, onto said absorber, the slope of said inner arms being defined by an angle $\alpha/2$ measured from said first extremal ray, where $\alpha$ substantially equals $\cos^{-1} R_1/R_2$.

2. The device of claim 1 wherein said adjacent facets extend below said absorber between end points no lower than a line connecting said end points and intersecting the bottom of said absorber.

3. The device of claim 2 wherein said absorber is circular in cross section.

4. The device of claim 3 further including a glazing of circular cross section enveloping said absorber and being between said absorber and said bottom reflector.

5. The device of claim 3 wherein all arms of said facets are straight line segments.

* * * * *